United States Patent
Jung et al.

(10) Patent No.: US 12,402,215 B2
(45) Date of Patent: Aug. 26, 2025

(54) INDUCTION HEATING DEVICE PROVIDING IMPROVED USER EXPERIENCE AND USER INTERFACE

(71) Applicant: LG Electronics Inc., Seoul (KR)

(72) Inventors: Mijin Jung, Seoul (KR); Hyeonna Han, Seoul (KR)

(73) Assignee: LG Electronics Inc., Seoul (KR)

( * ) Notice: Subject to any disclaimer, the term of this patent is extended or adjusted under 35 U.S.C. 154(b) by 983 days.

(21) Appl. No.: 17/604,568

(22) PCT Filed: Apr. 16, 2020

(86) PCT No.: PCT/KR2020/005081
§ 371 (c)(1),
(2) Date: Oct. 18, 2021

(87) PCT Pub. No.: WO2020/213947
PCT Pub. Date: Oct. 22, 2020

(65) Prior Publication Data
US 2022/0201809 A1    Jun. 23, 2022

(30) Foreign Application Priority Data
Apr. 18, 2019  (KR) .................. 10-2019-0045750

(51) Int. Cl.
| | | |
|---|---|---|
| *H05B 6/12* | (2006.01) | |
| *H05B 6/06* | (2006.01) | |
| *H05B 6/40* | (2006.01) | |

(52) U.S. Cl.
CPC ............. *H05B 6/1218* (2013.01); *H05B 6/06* (2013.01); *H05B 6/40* (2013.01)

(58) Field of Classification Search
CPC ...... H05B 6/062; H05B 6/1218; H05B 6/129; H05B 2213/03; H05B 6/1263;
(Continued)

(56) References Cited

U.S. PATENT DOCUMENTS

| | | | |
|---|---|---|---|
| 2013/0098901 A1* | 4/2013 | Corleoni | .............. H05B 6/12 219/620 |
| 2020/0196398 A1 | 6/2020 | Ok et al. | |

FOREIGN PATENT DOCUMENTS

| | | |
|---|---|---|
| EP | 2688364 | 1/2014 |
| EP | 2988573 | 7/2017 |

(Continued)

OTHER PUBLICATIONS

Garcia, EP 2688364 A1 (Year: 2014).*
(Continued)

*Primary Examiner* — Vy T Nguyen
(74) *Attorney, Agent, or Firm* — Fish & Richardson P.C.

(57) ABSTRACT

An induction heating device provides improved user experience and user interface. The induction heating device includes a first control module that senses a working coil disposed below an object to be heated among a plurality of working coils, and a second control module that controls an input interface to display an image for indicating an optimal heating position of any one object to be heated among a plurality of objects arranged close to each other. The image for indicating the optimal heating position is displayed when there is an interference between vessels.

16 Claims, 9 Drawing Sheets

1

(58) Field of Classification Search
CPC ............... H05B 6/1272; H05B 6/1209; H05B 2206/022; H05B 2213/05; H05B 6/1245; H05B 6/105; H05B 6/12; H05B 2206/02; H05B 3/74; H05B 6/065; H05B 6/06; H05B 6/1281; H05B 6/40; H05B 6/04; A47J 37/0629; A47J 37/0635; A47J 37/08; F24C 7/067; F24C 7/08; F24C 7/082; F24C 15/02; F24C 15/04; F24C 7/083; F24C 15/023; F24C 15/162; F24C 7/085; F24C 15/08; F24C 15/34; F24C 7/043; F24C 7/046; F24C 7/062; F24C 7/086; F24C 7/087; F24C 7/088; F24C 15/006; G06F 3/04847; G06F 3/0488; G06F 1/182; G06F 1/3206; G06F 1/3265; G06F 1/3287; G06F 3/0481; G06F 3/0482; G06F 3/04842; G01K 1/026; G01K 7/02; G01K 13/00; G01K 2207/06; G01K 3/10; H02J 50/005; H02J 50/10

USPC .................................................. 219/624, 623
See application file for complete search history.

(56) References Cited

FOREIGN PATENT DOCUMENTS

| | | |
|---|---|---|
| JP | 2009238613 | 10/2009 |
| JP | 2016025031 | 2/2016 |
| JP | 6052585 | 12/2016 |
| JP | 6227162 | 11/2017 |
| KR | 20190024546 | 3/2019 |

OTHER PUBLICATIONS

Keisker, EP 2988573 A1 (Year: 2016).*
Kurose, WO 2015159536 A1 (Year: 2015).*
Extended European Search Report in European Appln. No. 20791379.9, mailed on Nov. 28, 2022, 11 pages.

* cited by examiner

INDUCTION HEATING DEVICE PROVIDING IMPROVED USER EXPERIENCE AND USER INTERFACE

CROSS-REFERENCE TO RELATED APPLICATIONS

This application is a National Stage application under 35 U.S.C. § 371 of International Application No. PCT/KR2020/005081, filed on Apr. 16, 2020, which claims the benefit of Korean Patent Application No. 10-2019-0045750, filed on Apr. 18, 2019. The disclosures of the prior applications are incorporated by reference in their entirety.

TECHNICAL FIELD

The present invention relates to an induction heating device that can provide improved user experience (UX) and user interface (UI).

BACKGROUND ART

Various types of cooking apparatuses are used to heat food at homes and restaurants. Conventionally, gas ranges that are fueled by gas have been widely used. However, in recent years, apparatuses that are used to heat an object subject to heating such as a vessel including a pot, using electricity instead of gas, have been used.

Methods for heating an object subject to heating using electricity are broadly classified as a resistance heating method and an induction heating method.

The resistance heating method is a method by which an object subject to heating is heated by heat that is generated when electric current flows through a metallic resistance wire, or through a non-metallic heating element such as silicon carbide and that then is delivered to the object subject to heating (e.g., a cooking vessel) through radiation or conduction.

The induction heating method is a method by which an object subject to heating itself is heated by eddy currents that are generated in the object subject to heating, which is comprised of metallic ingredients, using a magnetic field that is generated around a coil when a predetermined magnitude of high-frequency power is supplied to the coil.

An induction heating device to which the method of induction heating is applied is generally provided with a working coil respectively in a corresponding area to heat each of the plurality of objects subject to heating (e.g., a cooking vessel).

However, recently, an induction heating device (i.e., a zone free-type induction heating device), in which a plurality of working coils simultaneously heat a single object, has been widely used. The zone free-type induction heating device may inductively heat an object subject to heating regardless of a size and position of the object subject to heating in an area where a plurality of working coils are provided.

A zone free-type induction heating device is disclosed in Japanese Patent No. 6052585B2.

The zone free-type induction heating device may be provided with an input interface. The input interface, which is a module for inputting heating intensity or driving time and the like desired by a user, may be implemented in various different forms including a physical button or a touch panel and the like. Further, the input interface may be provided with a display panel (i.e., a touch screen-type panel) that displays a driving state (e.g., a burner image for an object subject to heating) of the induction heating device.

In case a plurality of objects subject to heating are placed close to each other (i.e., when a plurality of vessels interfere with each other), the zone free-type induction heating device of the related art excludes some of the objects subject to heating placed close to each other from the objects subject to heating and deactivates burner images (i.e., a burner image for an object subject to heating excluded from the objects subject to heating) for some of the objects subject to heating, which are displayed on the input interface.

Accordingly, in the related art, in case a plurality of objects subject to heating are placed close to each other, the user may not adjust heating intensity and the like for some of the objects subject to heating placed close to each other through the input interface.

Further, the user may not figure out where an object subject to heating excluded from the objects subject to heating has to be placed when it comes to heating efficiency.

DETAILED DESCRIPTION OF INVENTION

Technical Problems

The embodiment of the present invention is directed to an induction heating device that may display an image for guiding an optimal heating position when vessels interfere with each other.

The embodiment of the present invention is also directed to an induction heating device that may provide improved user experience (UX) and user interface (UI).

Aspects of the present invention are not limited to the above-described ones. Additionally, other aspects and advantages that have not been mentioned may be clearly understood from the following description and may be more clearly understood from embodiments. Further, it will be understood that the aspects and advantages of the present invention may be realized via means and combinations thereof that are described in the appended claims.

Solutions to Problem

According to an embodiment, an induction heating device may include a first control module that senses a working coil which has an object subject to heating at an upper side thereof among a plurality of working coils, and a second control module that controls an input interface such that an image for guiding an optimal heating position of any one object subject to heating among a plurality of objects subject to heating placed close to each other is displayed on the input interface, thereby making it possible to display an image for guiding an optimal heating position at the time of interference between vessels.

According to an embodiment, an induction heating device may include an input interface that is flatly buried into an upper surface of a cover plate, that receives a touch input from a user and that displays a specific image, a second control module that controls a specific image displayed on the input interface on the basis of the touch input supplied by the input interface, and a first control module that controls the driving of at least one of a plurality of working coils on the basis of the touch input supplied by the second control module, thereby making it possible to provide improved user experience and user interface.

Effects of the Invention

The induction heating device may display an image for guiding an optimal heating position at the time of interference between vessels, thereby enabling a user to efficiently rearrange the vessels, and may enable the user to efficiently rearrange the vessels, thereby improving heating efficiency and preventing overheating at the time of the heating of a plurality of objects subject to heating. By doing so, improved user satisfaction and safety may be ensured.

The induction heating device may provide improved user experience and user interface, thereby enhancing user convenience under different conditions.

DETAILED DESCRIPTION OF EMBODIMENTS

Figure 1:
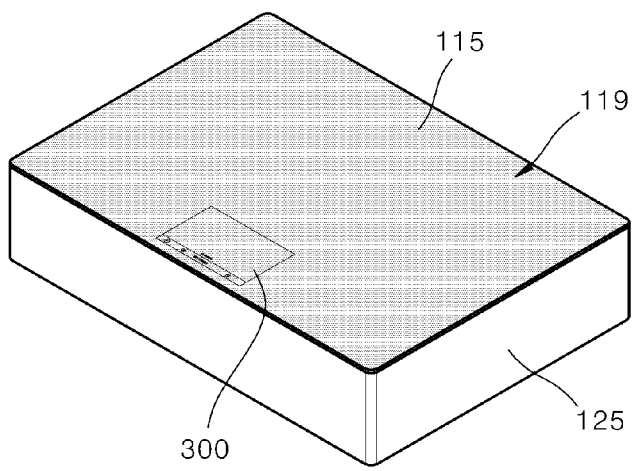
FIG. 1 is a perspective view illustrating an induction heating device according to an exemplary embodiment of the present invention.

The above-described aspects, features and advantages are specifically described with reference to the accompanying drawings hereunder such that one having ordinary skill in the art to which the present invention pertains may easily implement the technical spirit of the invention. In describing the invention, detailed description of known technologies in relation to the invention is omitted if it is deemed to make the gist of the present invention unnecessarily vague. Below, preferred embodiments of the present invention are specifically described with reference to the accompanying drawings. Throughout the drawings, identical reference numerals denote identical or similar components.

When any component is described as being "at an upper portion (or a lower portion)" of a component, or "on (or under)" a component, any component may be placed on the upper surface (or the lower surface) of the component, and an additional component may be interposed between the component and any component placed on (or under) the component.

When a component is described as being "connected," "coupled" or "connected" to another component, the components may be directly connected or coupled; however, it is also to be understood that an additional component may be "interposed" between the components, or the components may be "connected," "coupled" or "connected" through an additional component.

Below, an induction heating device according to an embodiment is described.

Figure 2:
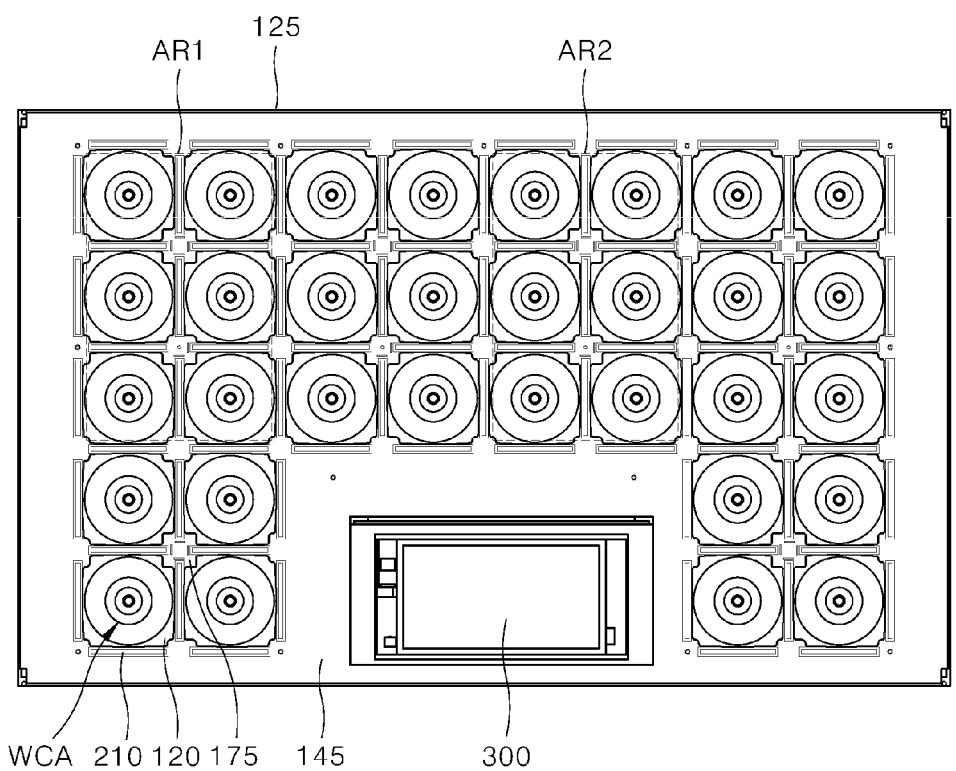
FIG. 2 is a plane view illustrating a state in which some components of the induction heating device in FIG. 1 are omitted according to an exemplary embodiment of the present invention.
Figure 3:
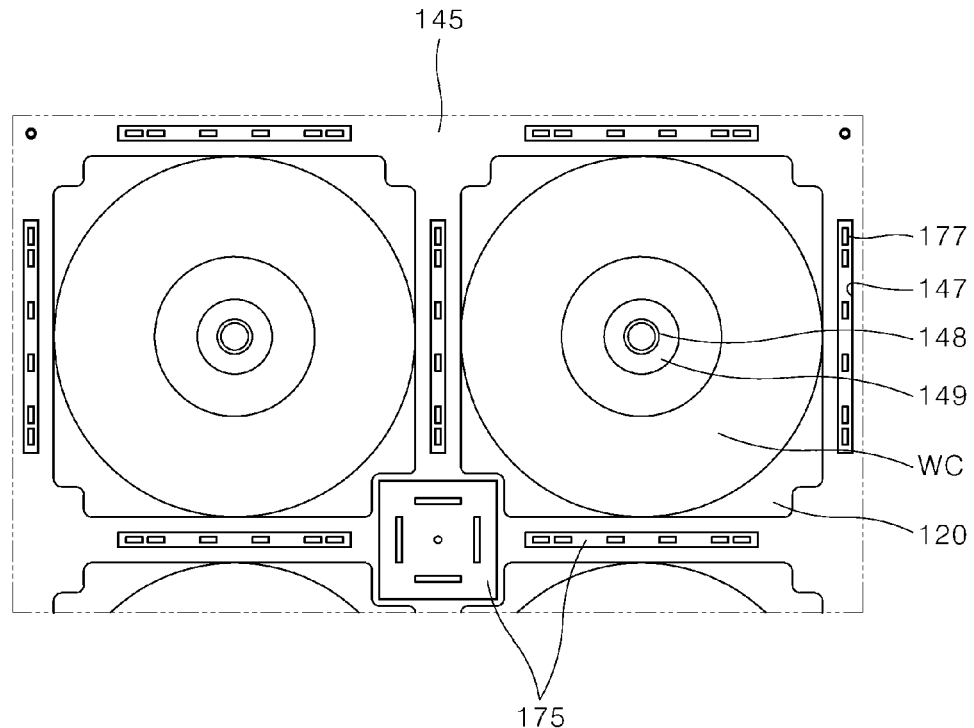
FIGS. 3 and 4 are partially enlarged views illustrating the induction heating device in FIG. 2 according to an exemplary embodiment of the present invention.
Figure 4:
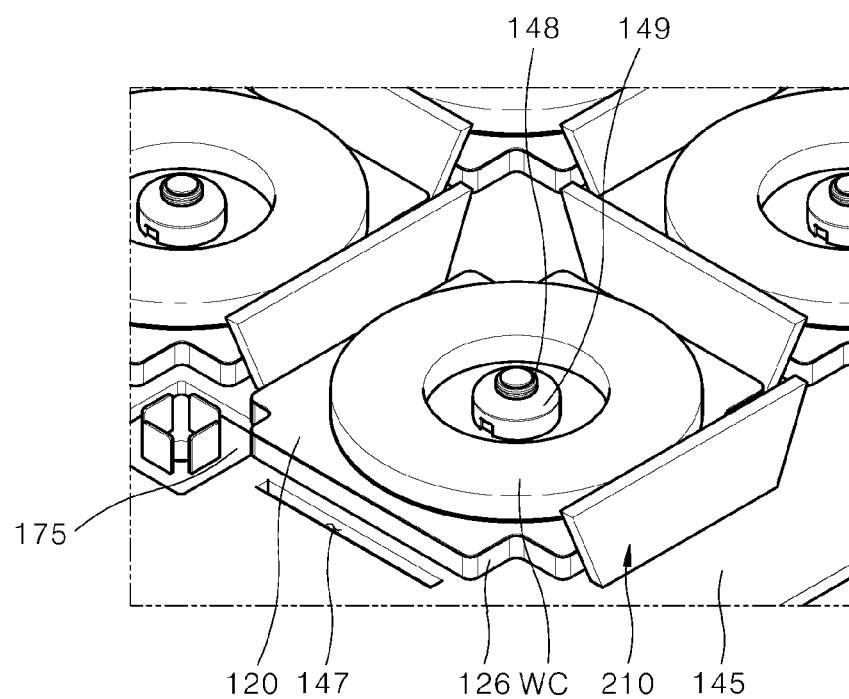
Figure 5:
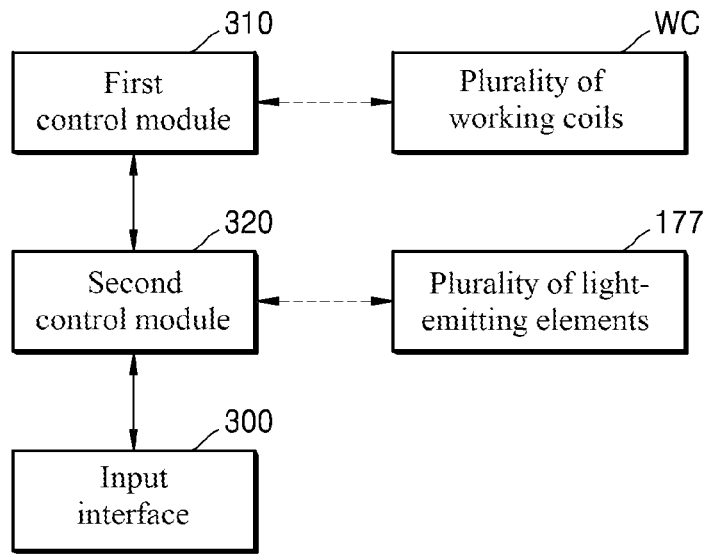
FIG. 5 is a block diagram for describing a flow of control of the induction heating device in FIG. 1 according to an exemplary embodiment of the present invention.

FIG. 1 is a perspective view illustrating an induction heating device according to an exemplary embodiment of the present invention. FIG. 2 is a plane view illustrating a state in which some components of the induction heating device in FIG. 1 are omitted according to an exemplary embodiment of the present invention. FIGS. 3 and 4 are partially enlarged views illustrating the induction heating device in FIG. 2 according to an exemplary embodiment of the present invention. FIG. 5 is a block diagram for describing a flow of control of the induction heating device in FIG. 1 according to an exemplary embodiment of the present invention.

For convenience of description, FIG. 2 is a view illustrating an induction heating device without a cover plate 119 in FIG. 1, and FIGS. 3 and 4 are views illustrating a state in which some components (e.g., a light guide) of the induction heating device 1 in FIG. 2 are omitted.

Referring to FIGS. 1 to 5, the induction heating device 1 according to an exemplary embodiment of the present invention may include a case 125, a cover plate 119, a base plate 145, an indicator substrate 175, an indicator (i.e., an indicator comprised of a light-emitting element 177 and a light guide 210), an input interface 300, a first control module 310, a second control module 320, a working coil assembly (WCA).

The case 125 may be thermally insulated to prevent heat generated by a working coil (WC) from leaking outwards.

The case 125 may be provided with various components such as the working coil assembly (WCA), the base plate 145, the indicator substrate 175, the light-emitting element 177 and the light guide 210 and the like that constitute the induction heating device 1.

The case 125 may be further provided with various devices (e.g., a power supply that supplies AC power, a rectifier that rectifies AC power of the power supply into DC power, an inverter that converts DC power rectified by the rectifier into a resonance current through a switching operation and that supplies the resonance current to a working coil (WC), a relay or a semiconductor switch that turns on or turns off a working coil (WC), and the like) in relation to the driving of the working coil (WC), an indicator substrate supporter (not illustrated) where an indicator substrate 175 is installed, a blowing fan (not illustrated) that cools heat generated in a working coil (WC) or a light-emitting element 177 and the like. Detailed description in relation to those devices is omitted.

The cover plate 119 may be coupled to an upper end of the case 125 and may shield an inside of the case 125. An object subject to heating (not illustrated) may be placed on an upper surface of the cover plate 119.

Specifically, the cover plate 119 may include an upper plate 115 (i.e., the upper surface of the cover plate 119) for placing an object subject to heating such as a cooking vessel, and heat generated in the working coil (WC) may be delivered to the object subject to heating through the upper plate 115.

The upper plate 115, for example, may be made of a glass material, and an input interface 300 that receives a touch input from a user and delivers the touch input to the second control module 320 may be installed on the upper plate 115.

The input interface 300 may be flatly buried into the upper surface of the cover plate 119, i.e., may be flatly buried into the upper plate 115 (That is, the input interface 300 may be installed flatly on the same flat surface as the upper plate 115.), and may be controlled by the second control module 320 to display a specific image (e.g., a burner image, a remaining heat image, a heating intensity image, a timer image, an image for guiding an optimally changed position and the like.). Further, the input interface 300 may receive a touch input from the user and may supply the received touch input to the second control module 320.

The input interface 300, which is a module for inputting heating intensity or heating time and the like desired by the user, may be implemented in various different forms such as a physical button or a touch panel and the like. Additionally, the input interface 300 may be provided with a display panel (i.e., a touch screen-type panel) that displays a driving state and the like of the induction heating device 1.

The input interface 300 may deliver a touch input supplied by the user to the second control module 320, and the second control module 320 may deliver the touch input to the first control module 310. Detailed description in relation to this is described hereunder.

The working coil assembly (WCA) may include a working coil (WC), a ferrite core 126, and a mica sheet 120 (i.e., a first mica sheet).

In case the induction heating device 1 is a zone free-type induction heating device, a plurality of working coil assemblies (WCA), as illustrated in FIG. 2, may be provided, and the plurality of working coil assemblies (e.g., WCA) may be spaced a predetermined distance apart from each other.

A plurality of working coils (e.g., WC) included in the plurality of working coil assemblies (e.g., WCA) may be controlled individually or in a group.

Specifically, the plurality of working coils, for example, may be controlled in a group such as a first working coil group (i.e., a plurality of working coils disposed in a first area (AR1)) and a second working coil group (i.e., a plurality of working coils disposed in a second area (AR2)), and each working coil group may be independently controlled by an individual inverter. Working coils included in each working coil group may be independently controlled by the above-described relay or semiconductor switch.

For convenience of description, a single working coil assembly (WCA) is described as an example.

The working coil (WC) may be comprised of wires that are wound in a ring shape a plurality of times, and may generate an AC magnetic field. Additionally, the driving of the working coil (WC) may be controlled by the first control module 310, and a mica sheet 120 and a ferrite core 126 may be consecutively disposed at a lower side of the working coil (WC).

The ferrite core 126 may be disposed at the lower side of the working coil (WC), and a core hole (not illustrated) may be formed at a central portion of the ferrite core 126 to perpendicularly overlap with a ring-shaped inside of the working coil (WC).

Specifically, a base plate 145 may be disposed at a lower side of the ferrite core 126, and the mica sheet 120 may be disposed between the ferrite core 126 and the working coil (WC).

As illustrated in FIGS. 3 and 4, a packing gasket 149 may be coupled to the corer hole such that the ferrite core 126 is fixed onto the base plate 145. A sensor 148 may be installed at an upper end of the packing gasket 149. The sensor 148 may sense a temperature of the upper plate 115, and a temperature or an operation and the like of the working coil (WC), and may deliver temperature information or operation information and the like to the above-described second control module 320 or the first control module 310.

The ferrite core 126 may be fixed to the mica sheet 120 through a sealant, and may spread an AC magnetic field generated in the working coil (WC).

The mica sheet 120 (i.e., a first mica sheet) may be disposed between the working coil (WC) and the ferrite core 126, and may be provided with a sheet hole (not illustrated) at a central portion thereof to perpendicularly overlap with the ring-shaped inside of the working coil (WC).

The mica sheet 120 may be fixed to the working coil (WC) and the ferrite core 126 through a sealant, and may prevent heat generated by the working coil (WC) from being directly delivered to the ferrite core 126.

Though not illustrated in the drawings, the working coil assembly (WCA) may further include a second mica sheet (not illustrated) that is fixed to the upper end of the working coil (WC) through a sealant and that is provided with a second sheet hole (not illustrated) formed at a central portion of the second mica sheet to perpendicularly overlap with the ring-shaped inside of the working coil (WC).

For convenience of description, detailed description in relation to the second mica sheet is omitted.

The working coil assembly (WCA) may be installed at the base plate 145.

Specifically, the ferrite core 126, the mica sheet 120, and the working coil (WC) may be consecutively stacked on the base plate 145. An indicator substrate 175 may be placed to be spaced apart from the base plate 145 at a lower side of the base plate 145.

The base plate 145, for example, may be integrally formed and may be made of aluminum (Al), but not be limited.

Further, the base plate 145 may be provided with a light guide 210.

Specifically, the light guide 210 may be provided around the working coil (WC) at the base plate 145. That is, four light guides (e.g., 210) per a single working coil (WC) may be installed around the working coil (WC).

The light guide 210 may display light, emitted from a light-emitting element 177, through a light-emitting surface (i.e., an upper surface) of an upper end thereof, and may display whether the working coil (WC) operates and may display output intensity (i.e., heating intensity) of the working coil (WC). Each light guide 210 may be installed at each light guide installation hole 147 formed at the base plate 145.

The light guide installation hole 147 for installing a light guide 210, as illustrated in FIGS. 3 and 4, may be formed at the base plate 145 in a space between the ferrite cores. That is, the light guide installation hole 147 may be formed at the base plate 145 along a position where the light guide 210 is installed. Accordingly, the light guide installation hole 147 may also be formed around a working coil (WC), and four light guide installation holes (e.g., 147) per a single working coil (WC) may be formed around the working coil (WC).

The number of the light guide installation holes 147 may be the same as the number of the light guides 210.

Light emitted from a light-emitting element 177 installed at the indicator substrate 175 may be delivered to the light guide 210 through the light guide installation hole 147. Accordingly, the light guide 210 may display whether the working coil (WC) operates and may display output intensity (i.e., heating intensity) of the working coil (WC).

The indicator substrate 175 may be spaced apart from the base plate 145 at the lower side of the base plate 145, and a light-emitting element 177 may be installed at the indicator substrate 175.

Specifically, the indicator substrate 175 may be installed on an indicator substrate supporter (not illustrated) to be spaced downwards apart from the base plate 145. The indicator substrate 175, for example, may be implemented in the form of a printed circuit board (PCB). Though not illustrated in the drawings, the indicator substrate 175 may be further provided with various components for driving the light-emitting element 177.

As illustrated in FIG. 3, a plurality of light-emitting elements (e.g., 177) may be provided and may be installed at the indicator substrate 175 (i.e., a lower side of the light guide 210) through the light guide installation hole 147 to be exposed upwards. Accordingly, light emitted from the light-emitting element 177 may be delivered to the light guide 210 through the light guide installation hole 147.

The plurality of light-emitting elements (e.g., 177), for example, may include a light-emitting diode (LED) respectively, and may be controlled by the second control module 320.

The first control module 310 may control the driving of the plurality of working coils (e.g., WC).

The first control module 310 may detect a degree to which a resonance current flowing in each working coil is reduced, and, on the basis of results of the detection, may sense a working coil that has an object subject to heating at an upper side thereof.

In case an object subject to heating is placed on a working coil (WC), the entire resistance may be increased due to resistance of the object subject to heating. Accordingly, a degree of a reduction in resonance currents flowing in the working coil (WC) may be increased.

The first control module 310, as described above, detects a resonance current flowing in a working coil (WC), and, on the basis of a value of the detection, may detect whether an object subject to heating is placed on the working coil (WC).

Certainly, the first control module 310 may sense an object subject to heating using another method. In the embodiment, the above-described method used to detect an object subject to heating is described as an example.

The first control module 310 may supply information of a position of the sensed object subject to heating to the second control module 320 and may receive a user's touch input from the second control module 320.

Certainly, the first control module 310 may control the driving of at least one of the plurality of working coils (e.g., WC) on the basis of the user's touch input supplied by the second control module 320.

The second control module 320 may control an image displayed on the input interface 300 and the driving of the plurality of light-emitting elements (e.g., 177).

Specifically, the second control module 320 may receive a user's touch input from the input interface 300, and may supply the received touch input to the first control module 310 or may control the input interface 300 or the light-emitting element 177 on the basis of the received touch input.

The second control module 320 may receive information on a position of an object subject to heating from the first control module 310 and may control the input interface 300 such that a burner image for the object subject to heating is displayed on the input interface 300 on the basis of the received information on the position of the object subject to heating.

In case an object subject to heating includes a plurality of objects subject to heating placed close to each other (e.g., first and second objects subject to heating), the second control module 320 may control the input interface 300 such that an image for guiding an optimal heating position of any one object subject to heating of the plurality of objects subject to heating is displayed on the input interface 300 on the basis of information on positions of the plurality of objects subject to heating supplied by the first control module 310.

The second control module 320, as described above, may perform various control functions. Detailed description in relation to this is described hereunder.

The induction heating device 1 according to an embodiment may also perform the function of wireless power transmission on the basis of the above-described configurations and features.

In recent years, technologies for wirelessly supplying power have been developed and have been widely used for various types of electronic devices. An electronic device, to which the wireless power transmitting technology is applied, can be charged only by being placed on a charge pad without connecting to an additional charge connector. Accordingly, the electronic device, to which the wireless power transmitting technology is applied, requires no cord or no charger, thereby ensuring improved mobility and a reduced size and weight.

The wireless power transmitting technology can be broadly classified as an electromagnetic induction technology using a coil, and a resonance technology using resonance, a radio emission technology for converting electric energy into microwaves and delivering the microwaves and the like. Among the technologies, the electromagnetic induction technology is a technology in which power is transmitted using electromagnetic induction between a primary coil provided at an apparatus for wirelessly transmitting power (e.g., a working coil (WC)) and a secondary coil provided at an apparatus for wirelessly receiving power.

The induction heating technology of an induction heating device 1 is substantially the same as the wireless power transmitting technology using electromagnetic induction, in that an object subject to heating is heated through electromagnetic induction.

Thus, the induction heating device 1 according to an embodiment may perform the functions of wireless power transmission as well as induction heating. Further, the second control module 320 or the first control module 310 may control induction heating mode or wireless power transmitting mode. Accordingly, when necessary, the function of induction heating or the function of wireless power transmission may be optionally performed.

The induction heating device 1 according to an embodiment has the above-described configurations and features. Below, an example of a method of guiding an optimal heating position of the induction heating device 1 is described with reference to FIGS. 6 to 12.

FIGS. 6 to 12 are views for describing an example of a method of guiding an optimal heating position of the induction heating device in FIG. 1.

Figure 11:
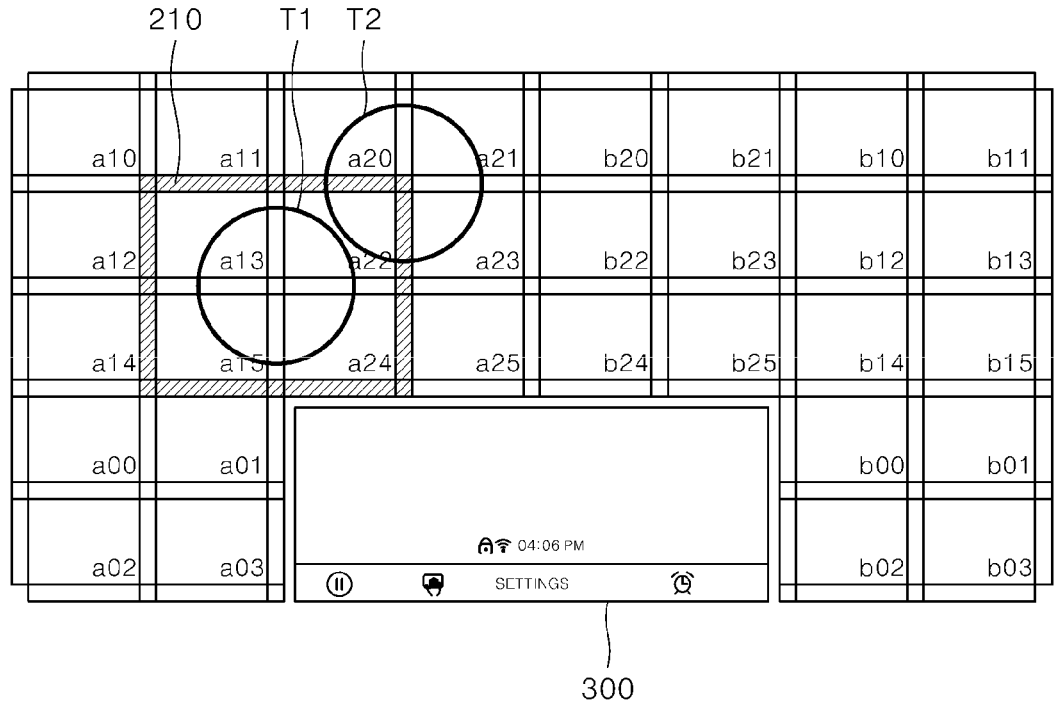
Figure 12:
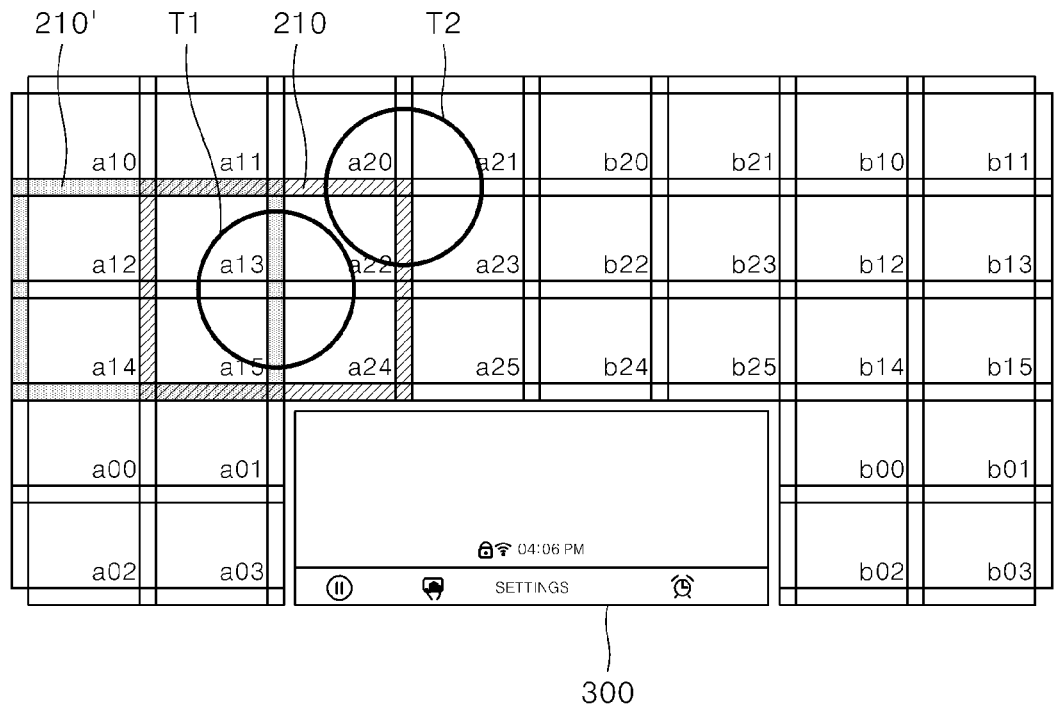

FIGS. 11 and 12 schematically illustrate a working coil, a light guide and an input interface for convenience of description. Additionally, positions of the first and second objects subject to heating in FIGS. 11 and 12 correspond to positions of the burner images for the first and second objects subject to heating in FIG. 6.

FIGS. 5 to 12 illustrate an example of a method of guiding an optimal heating position of the induction heating device 1 in FIG. 1.

A method of displaying a burner image for an object subject to heating on an input interface 300 is described, and then a method of guiding an optimal heating position is described.

Specifically, when first and second objects subject to heating (T1 and T2) are placed on an upper plate (115 in FIG. 1) of a cover plate (119 in FIG. 1), a first control module 310 may sense a working coils on which is placed the first and second objects subject to heating (T1 and T2) at an upper side thereof among a plurality of working coils (a00 to a03, a10 to a15, a20 to a25, b00 to b03, b10 to b15 and b20 to b25).

A second control module 320 may detect a degree to which a resonance current flowing through each working coil is reduced, and, on the basis of results of the detection, may sense a working coils on which is placed the first and second objects subject to heating (T1 and T2) at an upper side thereof among a plurality of working coils.

When positions of the first and second objects subject to heating (T1 and T2) are sensed, the first control module 310 may supply information on the sensed positions of the first and second objects subject to heating (T1 and T2) to the second control module 320.

Further, the second control module 320 may control the input interface 300 such that burner images (FI1 and FI2) for the first and second objects subject to heating are displayed on the input interface 300 on the basis of the information on the positions of the first and second objects subject to heating (T1 and T2) supplied by the first control module 310.

Figure 6:
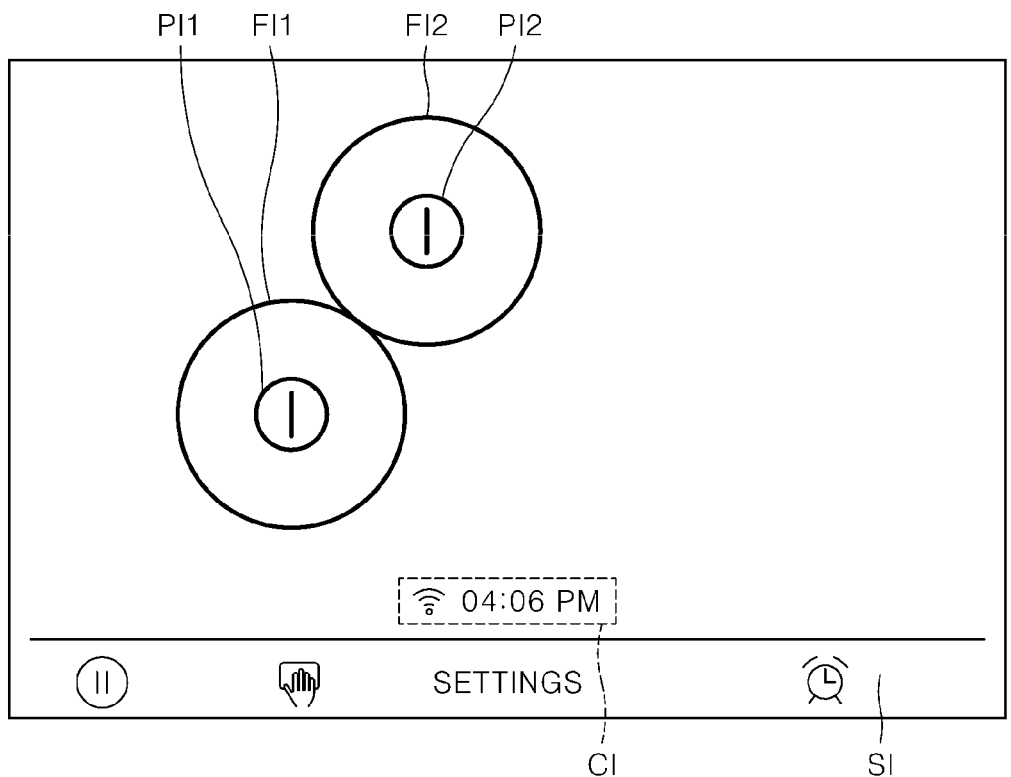
FIGS. 6 to 12 are views for describing an example of a method of guiding an optimal heating position of the induction heating device in FIG. 1.

For example, as illustrated in FIG. 6, burner images (FI1 and FI2) for objects subject to heating, a setting image (SI) that displays a setting icon (e.g., a temporary stop icon, a screen lock icon, a setting list icon, a timer icon and the like), and an auxiliary image (CI) that displays an auxiliary icon (e.g., a Wi-Fi connection state icon and a current time display icon) may be displayed on the input interface 300.

A burner image (FI1) for the first object subject to heating may be displayed in a specific area of the input interface 300 to correspond to the position of the first object subject to heating (T1) on the cover plate 119, and may be displayed by applying a size and a direction of rotation of the first object subject to heating (T1).

Certainly, a burner image (FI2) for the second object subject to heating may be displayed in a specific area of the input interface 300 to correspond to the position of the second object subject to heating (T2) on the cover plate 119, and may be displayed by applying a size and a direction of rotation of the second object subject to heating (T2).

That is, burner images (FI1 and FI2) for the first and second objects subject to heating may be displayed in specific areas of the input interface 300 corresponding respectively to actual positions of the first and second objects subject to heating (T1 and T2) on the upper plate 115 on the basis of a scale of the upper plate 115 of the cover plate 119 versus the input interface 300.

Further, a power image (PI1 and PI2) may be displayed at a center of each of the burner images (FI1 and FI2) for the first and second objects subject to heating.

Before an object subject to heating is placed on the upper plate 115 in a state in which the induction heating device 1 is turned on, the setting image (SI) and the auxiliary image (CI) may only be displayed on the input interface 300.

In case an object subject to heating is placed on the upper plate 115 and the first control module 310 senses a position of the object subject to heating as illustrated in FIG. 6, a burner image (e.g., FI1 and FI2) and a power image (e.g., PI1 and PI2) for the object subject to heating may be additionally displayed on the input interface 300.

Through the above-described method, the burner images (FI1 and FI2) for the first and second objects subject to heating may be displayed on the input interface 300.

In case a plurality of objects subject to heating (e.g., first and second objects subject to heating (T1 and T2)) are placed at an upper side of a single working coil (e.g., a22) in an overlapping manner, heating efficiency for the objects subject to heating may be deteriorated.

Figure 7:
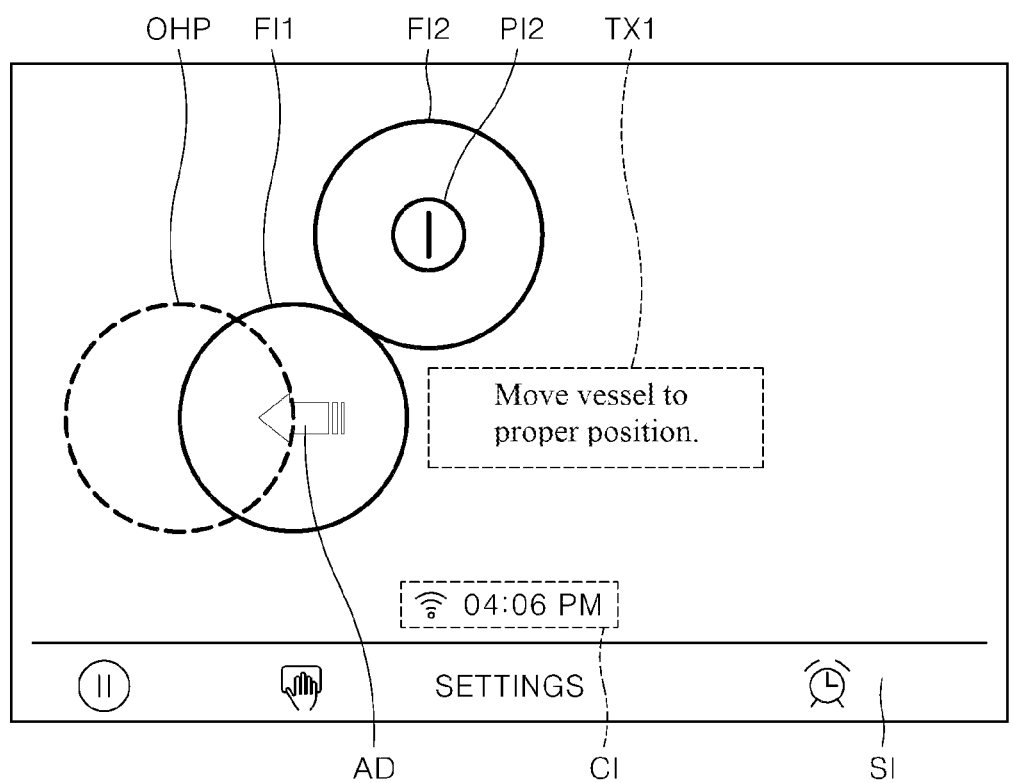

In case first and second objects subject to heating (T1 and T2) are all sensed at an upper side of any one working coil (e.g., a22) among a plurality of working coils as illustrated in FIG. 7, the second control module 320 may control the input interface 300 such that an image for guiding an optimal heating position of the first object subject to heating (T1) is displayed on the input interface 300 for a predetermined period.

The image for guiding an optimal heating position of the first object subject to heating (T1) may include a burner image (OHP) corresponding to an optimal heating position and an arrow image (AD) that indicates a direction of the first object subject to heating (T1) from the current position to an optimal heating position.

The image for guiding an optimal heating position of the first object subject to heating (T1) may further include a guide text image (TX1; e.g., "Move the vessel to a proper position.").

Figure 8:
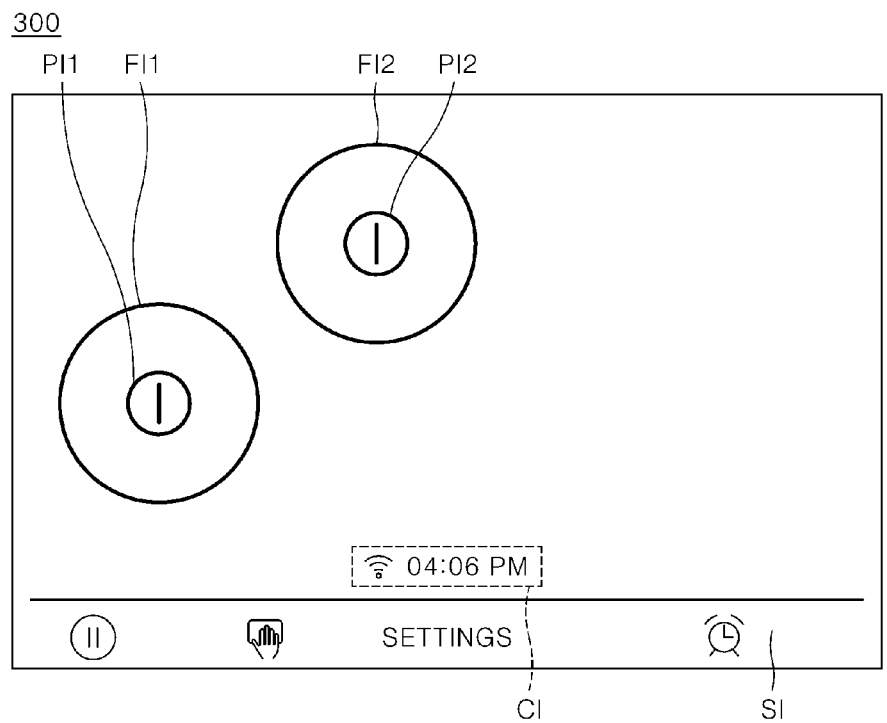

In case the user moves the first object subject to heating (T1) to the optimal heating position within a predetermined period after the image for guiding an optimal heating position of the first object subject to heating (T1) is displayed on the input interface 300, a burner image (FI1) and a power image (PI1) for the first object subject to heating may also be displayed at a position (i.e., the position of OHP in FIG. 7) corresponding to the optimal heating position as illustrated in FIG. 8.

Herein, when the first object subject to heating (T1) is moved to the optimal heating position, the first control module 310 may sense the changed position of the first object subject to heating (T1) and may supply the sensed information to the second control module 320. The second control module 320 may delete the image (i.e., OHP, AD and TX1) for guiding an optimal heating position of the first object subject to heating (T1) from the input interface 300 on the basis of the information supplied by the first control module 310.

Figure 9:
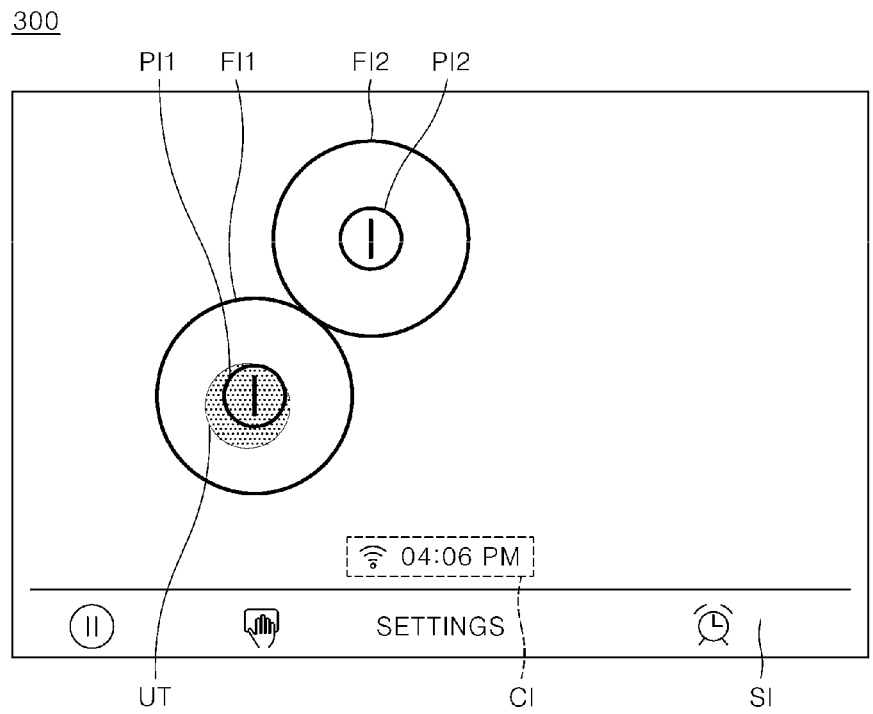

In case the first object subject to heating (T1) is not moved to the optimal heating position within the predetermined period, the second control module 320 may control the input interface 300 such that the image (i.e., OHP, AD and TX1) for guiding an optimal heating position of the first object subject to heating (T1) is deleted from the input interface 300 as illustrated in FIG. 9.

When the second control module 320 receives a touch input (UT) for selecting any one object subject to heating (e.g., the first object subject to heating (T1)) of the first and second objects subject to heating (T1 and T2) as a priority heating object from the input interface 300 in a state in which the image (i.e., OHP, AD and TX1) for guiding an optimal heating position of the first object subject to heating (T1) is deleted from the input interface 300, the second control module 320 may supply the touch input (UT) supplied by the input interface 300 to the first control module 310.

Next, the first control module 310 may drive a working coil (e.g., a13, a15, a22 and a24) disposed at a lower side of the object subject to heating (e.g., the first object subject to heating (T1)) selected as the priority heating object earlier than a working coil (e.g., a20 to a23) disposed at a lower side of an object subject to heating that is not selected as the priority heating object, among the plurality of working coils, on the basis of the touch input (UT) supplied by the second control module 320.

Certainly, a working coil (e.g., a22) disposed at the lower sides of both of the first and second objects subject to heating (T1 and T2) may also be driven to heat the object subject to heating (e.g., the first object subject to heating (T1)) selected as the priority heating object.

Figure 10:
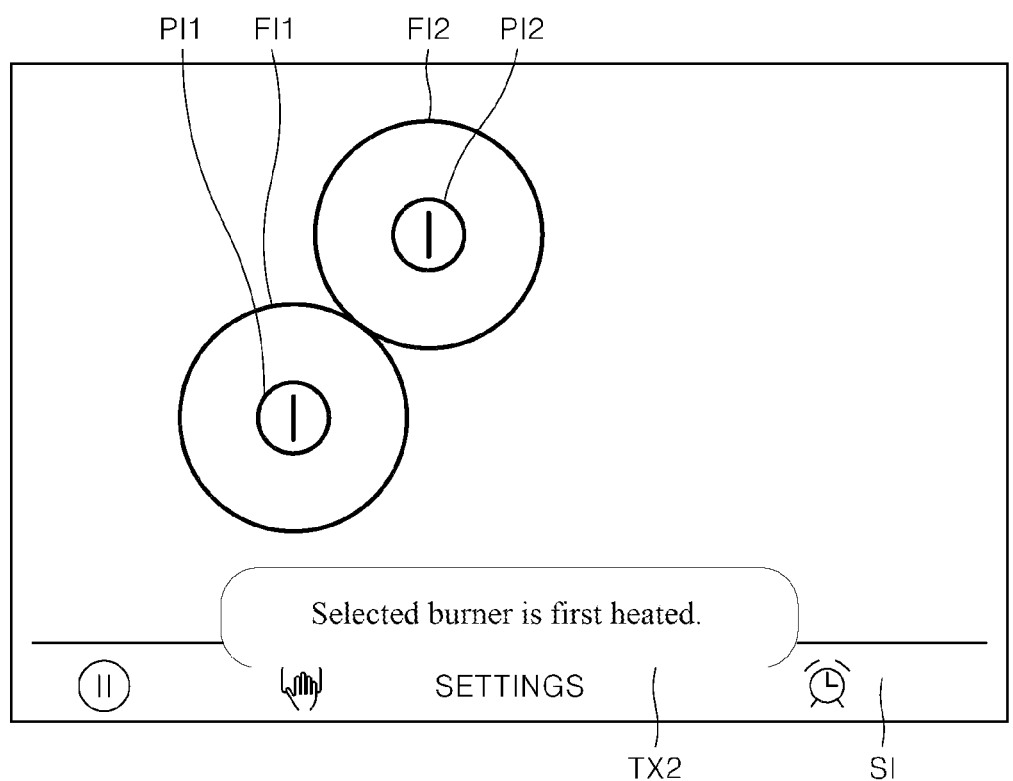

At the time of the driving of a working coil (e.g., a13, a15, a22 and a24) disposed at the lower side of the object subject to heating (e.g., the first object subject to heating (T1)) selected as the priority heating object, the second control module 320, as illustrated in FIG. 10, may control the input interface 300 such that a priority heating text image (TX2; e.g., "Selected burner is first heated.") is displayed on the input interface 300 on the basis of the touch input (UT).

Certainly, the second control module 320 may control the input interface 300 such that the priority heating text image (TX2) is deleted from the input interface 300 when a predetermined period passes after the priority heating text image (TX2) is displayed.

As illustrated in FIGS. 11 and 12, the second control module 320 may control the input interface 300 such that an image for guiding an optimal heating position of any one object subject to heating (e.g., the first object subject to heating (T1)) of the first and second objects subject to heating (T1 and T2) is displayed on the input interface 300, and, at the same time, may alternately turn on and turn off a light-emitting element disposed around the optimal heating position among a plurality of light-emitting elements.

Specifically, the second control module 320 may maintain the turn-on of a light-emitting element around a working coil (i.e., a13, a15, a22 and a24) placed at a lower side of an object subject to movement (e.g., the first object subject to heating (T1)), and may alternately turn on and turn off a light-emitting element disposed around a working coil (i.e., a12 to a15) placed at the optimal heating position.

A light-emitting element (e.g., a light-emitting element disposed a front end of a13 and a rear end of a15) that meets the above-described two positioning conditions may be alternately turned on and turned off or may be kept on.

As a result, the second control module 320 may maintain the turn-on of a light-emitting element disposed around a working coil (i.e., a13, a15, a22 and a24) placed at the lower side of the object subject to movement (e.g., the first object subject to heating (T1)), thereby allowing a light-emitting surface of a light guide 210 placed at an upper side of the light-emitting element to emit light. Further, the second control module 320 may alternately turn on and turn off a light-emitting element around a working coil (i.e., a12 to a15) placed at the optimal heating position, thereby allowing a light-emitting surface of a light guide 210' at an upper side of the light-emitting element to flicker. That is, the light-emitting state in FIG. 11 and the light-emitting state in FIG. 12 may be alternately repeated.

By doing so, the user may figure out which one of the first and second objects subject to heating (T1 and T2) is moved to the optimal heating position through the upper plate (115 in FIG. 1) as well as the input interface 300.

In summary, in case two or more objects subject to heating are placed at an upper side of a single working coil, the induction heating device 1 in FIG. 1 may suggest optimal heating positions of some of the objects subject to heating to the user through the input interface 300 and the upper plate (115 in FIG. 1), to prevent a deterioration of heating efficiency.

An example of a method of guiding an optimal heating position of the induction heating device 1 in FIG. 1 is implemented as described above. Below, another example of a method of guiding an optimal heating position of the induction heating device 1 is described with reference to FIG. 13.

Figure 13:
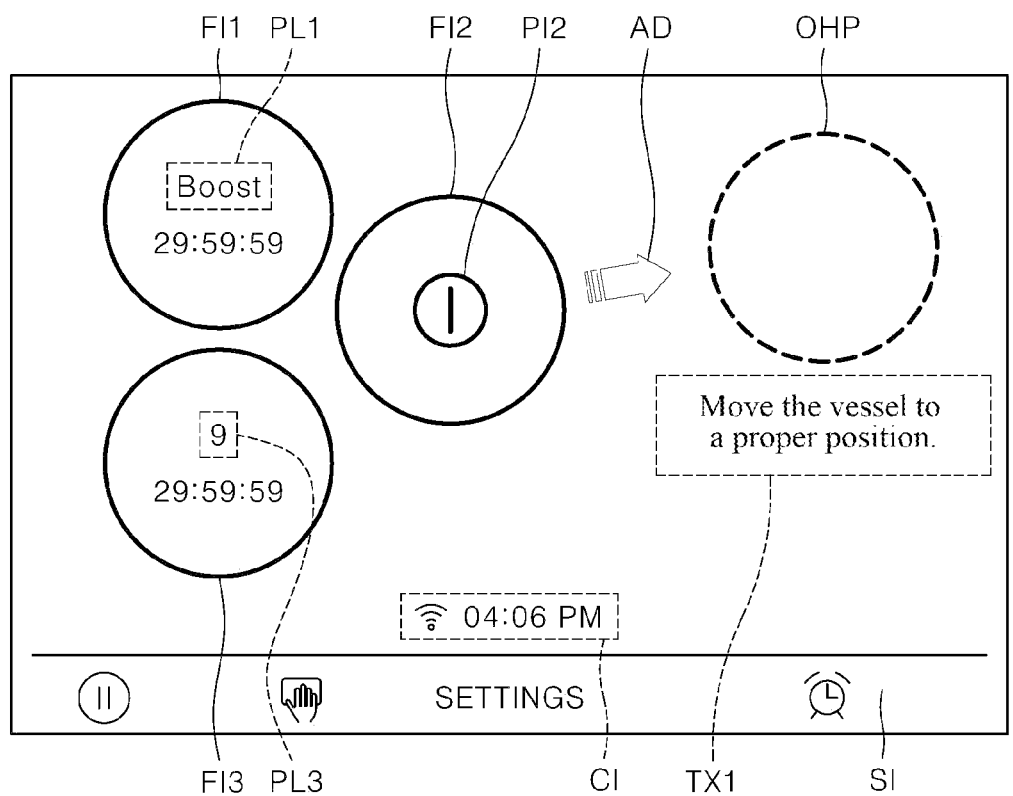
FIG. 13 is a view for describing another example of a method of guiding an optimal heating position of the induction heating device in FIG. 1.

FIG. 13 is a view for describing another example of a method of guiding an optimal heating position of the induction heating device in FIG. 1.

Another example of a method of guiding an optimal heating position in FIG. 13 includes methods the same as the methods of determining whether to delete an image for guiding an optimally changed position, selecting and heating a priority heating object, and driving a light-emitting element and the like that are described with reference to FIGS. 8 to 12. Description in relation to this is omitted.

Referring to FIGS. 5 and 13, in case a single object subject to heating (e.g., an object subject to heating corresponding to a burner image (FI2) for the second object subject to heating) is placed around at least one object subject to heating that is being heated in a state where at least one object subject to heating (e.g., first and third objects subject to heating (i.e., an object subject to heating corresponding to a burner image (FI1) for the first object subject to heating, and an object subject to heating corresponding to a burner image (FI3) for the third object subject to heating)) are heated with predetermined reference heating intensity or higher, the single object subject to heating is highly likely to be overheated.

Herein, the heating intensity (PL1) of the first object subject to heating indicates "boost mode heating" and the heating intensity (PL3) of the third object subject to heating indicates "9 (i.e., the highest level of heating intensity among levels of heating intensity of 1 to 9)".

That is, in case the second object subject to heating is placed around the first object subject to heating in a state where the first object subject to heating is being heated with the predetermined reference heating intensity or higher as illustrated in FIG. 13, the first object subject to heating is highly likely to be overheated. Accordingly, the second control module 320 may control the input interface 300 such that an image for guiding an optimal heating position of the second object subject to heating is displayed on the input interface 300 for a predetermined period.

The image for guiding an optimal heating position of the second object subject to heating may include a burner image (OHP) corresponding to an optimal heating position and an arrow image (AD) indicating a direction of movement of the second object subject to heating from the current position to an optimal heating position.

The image for guiding an optimal heating position of the second object subject to heating may further include a guide text image (TX1; e.g., "Move the vessel to a proper position.").

In summary, in case an additional object subject to heating is placed near at least one object subject to heating in a state where the one object subject to heating is being heated with predetermined reference heating intensity or higher, the induction heating device 1 in FIG. 1 may suggest an optimal heating position of the additional object subject to heating to the user through the input interface 300 and the upper plate (115 in FIG. 1), to prevent overheating.

Another example of a method of guiding an optimal heating position of the induction heating device 1 in FIG. 1 is implemented as described above. Below, yet another example of a method of guiding an optimal heating position of the induction heating device 1 is described with reference to FIG. 14.

Figure 14:
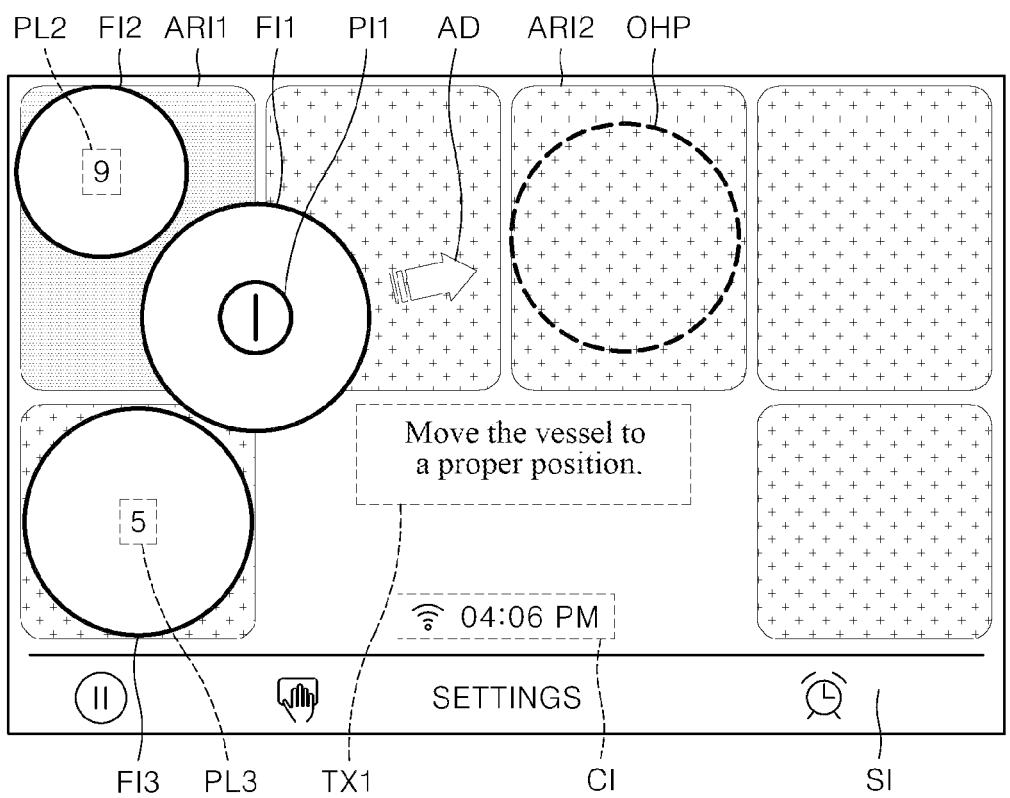
FIG. 14 is a view for describing yet another example of a method of guiding an optimal heating position of the induction heating device in FIG. 1.

FIG. 14 is a view for describing yet another example of a method of guiding an optimal heating position of the induction heating device in FIG. 1.

Yet another example of a method of guiding an optimal heating position in FIG. 14 includes methods the same as the methods of determining whether to delete an image for guiding an optimally changed position, selecting and heating a priority heating object, and driving a light-emitting element and the like that are described with reference to FIGS. 8 to 12. Description in relation to this is omitted.

The induction heating device 1 in FIG. 1 further includes a first inverter (not illustrated) which performs a first switching operation to supply a resonance current to a working coil in a first area (AR1 in FIG. 2) among the plurality of working coils, and the first switching operation of which is controlled by the second control module 320, and a second inverter (not illustrated) which performs a second switching operation to supply a resonance current to a working coil in a second area (AR2 in FIG. 2) among the plurality of working coils, and the second switching operation of which is controlled by the second control module 320. Description is provided under the assumption that the first and second switching operations are different and that the first and second areas (AR1 and AR2 in FIG. 2) are different.

Additionally, description is provided under the assumption that a position of the first area (AR1 in FIG. 2), which is an image displayed for description and is not actually displayed on the input interface 300, corresponds to a position of a first virtual area (ARI1) in FIG. 14 and that a position of the second area (AR2 in FIG. 2), which is an image displayed for description and is not actually displayed on the input interface 300, corresponds to a position of a second virtual area (ARI2) in FIG. 14.

Referring to FIGS. 5 and 14, in case output intensities required to heat a plurality of objects subject to heating (e.g., the first and second objects subject to heating (i.e., an object subject to heating corresponding to a burner image (FI1) for the first object subject to heating and an object subject to heating corresponding to a burner image (FI2) for the second object subject to heating)) are different, and the plurality of objects subject to heating are all sensed at an upper side of an area (e.g., the first area (AR1 in FIG. 2)) where a working coil controlled by the same inverter (e.g., the first inverter) is placed, operation efficiency of the inverter is deteriorated.

That is, in case output intensities required to heat the first and second objects subject to heating are different and both of the first and second objects subject to heating are sensed at an upper side of a working coil placed in the first area (AR1 in FIG. 2) as illustrated in FIG. 14, the second control module 320 may control the input interface 300 such that an image for guiding an optimal heating position of the first object subject to heating (T1) is displayed on the input interface 300 for a predetermined period.

The image for guiding an optimal heating position of the first object subject to heating (T1) may include a burner image (OHP) corresponding to an optimal heating position and an arrow image (AD) indicating a direction of movement of the first object subject to heating (T1) from the current position to an optimal heating position.

The image for guiding an optimal heating position of the first object subject to heating (T1) may further include a guide text image (TX1; e.g., "Move the vessel to a proper position.").

In FIG. 14, the optimal heating position of the first object subject to heating may correspond to an upper side of a working coil placed in the second area (AR2 in FIG. 2).

In summary, in case output intensities required to heat a plurality of objects subject to heating are different, and the plurality of objects subject to heating are all sensed at an upper side of an area where a working coil controlled by the same inverter is placed, the induction heating device 1 in FIG. 1 may suggest optimal heating positions of some of the plurality of objects subject to heating through the input interface 300 and the upper plate (115 in FIG. 1) to the user, to prevent a deterioration of operation efficiency of the inverter.

As describe above, the induction heating device 1 according to an embodiment may display an image for guiding an optimal heating position at the time of interference between vessels, thereby enabling the user to efficiently rearrange the vessels, and may enable the user to efficiently rearrange the vessels, thereby improving heating efficiency and preventing overheating at the time of the heating of a plurality of objects subject to heating. By doing so, improved user satisfaction and safety may be ensured.

The induction heating device 1 according to an embodiment may provide improved user experience and user interface, thereby enhancing user convenience under different conditions.

The present invention has been described with reference to the embodiments and drawings. The invention may be replaced, modified and changed within the technical spirit of the invention by one having ordinary skill in the art to which the invention pertains. Thus, the invention should not be construed as being limited to the embodiments and drawings set forth herein.

INDUSTRIAL APPLICABILITY

The present invention is applicable to an induction heating device that generates eddy currents in an object subject to heating made of a metallic material using a magnetic field which is generated around a coil when predetermined-magnitude high-frequency power is supplied to the coil such that the object subject to heating itself is heated.

The invention claimed is:

1. An induction heating device, comprising:
a case;
a plurality of working coils provided in the case;
a cover plate that is coupled to an upper end of the case, the cover plate having an upper surface that is configured to set an object to be heated by at least one of the plurality of working coils;
an input interface that is flatly buried into the upper surface of the cover plate, that is configured to receive a touch input from a user, and that is configured to display a burner image for the object;
a first control module configured to process information on a degree of reduction of a resonance current flowing in each of the plurality of working coil to thereby determine which one of the plurality of working coils is located below the object to be heated; and
a second control module configured to, based on information on a position of the object determined from the first control module, control display of the burner image on the input interface, and
wherein the second control module is configured to, based on first and second objects being placed on the upper surface of the cover plate control the input interface to display an image for guiding an optimal heating position of any one of the first and second objects, and
wherein the image for guiding the optimal heating position includes (i) a first burner image corresponding to the optimal heating position of the first object and (ii) an arrow image that indicates a direction of movement from a current position to the optimal heating position of the first object.

2. The induction heating device of claim 1, wherein the second control module controls the input interface to display the image for guiding the optimal heating position of the first object for a predetermined period.

3. The induction heating device of claim 2, wherein the second control module is configured to, based on the first object not being moved to the optimal heating position within the predetermined period, control the input interface to stop displaying the image for guiding the optimal heating position of the first object.

4. The induction heating device of claim 3, wherein the second control module is configured to, based on a touch input for selecting any one object of the first and second objects as a priority heating object being received from the input interface in a state in which the image for guiding the optimal heating position of the first object is deleted from the input interface, provide information of the touch input supplied by the input interface to the first control module, and wherein the first control module is configured to, based on the information of the touch input provided from the second control module, control driving of a working coil placed at a lower side of the priority heating object earlier than a working coil placed at a lower side of an object not selected as the priority heating object, among the plurality of working coils.

5. The induction heating device of claim 1, wherein the second control module is configured to, based on the second object being placed within a distance from the first object in a state in which the first object is being heated with a predetermined reference heating intensity or higher, control display of an image for guiding the optimal heating position of the second object on the input interface for a predetermined period.

6. The induction heating device of claim 5, wherein the second control module is configured to, based on the second object not being moved to the optimal heating position of the second object within the predetermined period, control the input interface to stop displaying the image for guiding the optimal heating position of the second object.

7. The induction heating device of claim 6, wherein the second control module is configured to, based on a touch input for selecting any one object of the first and second objects as a priority heating object being received from the input interface in a state in which the image for guiding the optimal heating position of the second object is deleted from the input interface, provide information of the touch input supplied by the input interface to the first control module, and wherein the first control module is configured to, based on the information of the touch input provided from the second control module, control driving of a working coil placed at a lower side of the priority heating object earlier than a working coil placed at a lower side of an object not selected as the priority heating object, among the plurality of working coils.

8. The induction heating device of claim 5, wherein the image for guiding the optimal heating position of the second object includes (i) a second burner image displayed at the optimal heating position of the second object and (ii) an arrow image that indicates a direction of movement from a current position to the optimal heating position of the second object.

9. The induction heating device of claim 1, wherein the second control module is configured to, based on (i) output intensities to heat each of the first and second objects being different from each other, and (ii) both of the first and second objects being placed at an upper side of a working coil placed in a first area among the plurality of working coils, control the input interface to display the image for guiding the optimal heating position of the first object for a predetermined period.

10. The induction heating device of claim 9, wherein the second control module is configured to, based on the first object not being moved to the optimal heating position of the first object within the predetermined period, control the input interface to stop displaying the image for guiding the optimal heating position of the first object.

11. The induction heating device of claim 10, wherein the second control module is configured to, based on a touch input for selecting any one object of the first and second objects as a priority heating object being received from the input interface in a state in which the image for guiding the optimal heating position of the first object is deleted from the input interface, provide information of the touch input supplied by the input interface to the first control module, and wherein the first control module is configured to, based on the information of the touch input provided from the second control module, control driving of a working coil placed at a lower side of the priority heating object earlier than a working coil placed at a lower side of an object not selected as the priority heating object, among the plurality of working coils.

12. The induction heating device of claim 9, wherein the optimal heating position of the first object corresponds to an upper side of a working coil placed in a second area among the plurality of working coils.

13. The induction heating device of claim 1, further comprising:
a plurality of light guides installed around each of the plurality of working coils and configured to display whether each of the plurality of working coils is driven and to display heating intensity of each of the plurality of working coils; and
a plurality of light-emitting elements controlled by the second control module and provided at a lower side of each of the plurality of light guides to emit light.

14. The induction heating device of claim 13, wherein the second control module is configured to control the input interface to display the image for guiding the optimal heating position of any one object of the first and second objects while controlling a light-emitting element placed around the optimal heating position among the plurality of light-emitting elements to alternately turn on and turn off.

15. The induction heating device of claim 1, wherein the input interface is configured to provide information of the touch input to the second control module,
wherein the second control module is configured to control the input interface to display the burner image for the object based on the touch input supplied by the input interface and to provide the information of the touch input to the first control module, and
wherein the first control module is configured to control driving of at least one of the plurality of working coils based on the information of the touch input provided from the second control module.

16. The induction heating device of claim 1, wherein the burner image for the object is displayed in a specific area of the input interface to correspond to the position of the object on the cover plate, and is displayed by applying a size and a direction of rotation of the object.

\* \* \* \* \*